United States Patent
Kokami et al.

(10) Patent No.: US 6,771,033 B2
(45) Date of Patent: Aug. 3, 2004

(54) DRIVE CONTROL SYSTEM FOR SENSOR-LESS MOTOR

(75) Inventors: Yasuhiko Kokami, Takasaki (JP); Kunihiro Kawauchi, Fujioka (JP); Toshiyuki Tsunoda, Maebashi (JP); Reiichi Kimura, Takasaki (JP)

(73) Assignees: Renesas Technology Corp., Tokyo (JP); Hitachi ULSI Systems Co., Ltd., Tokyo (JP); Hitachi Tohbu Semiconductor, Ltd., Gunma (JP)

( * ) Notice: Subject to any disclaimer, the term of this patent is extended or adjusted under 35 U.S.C. 154(b) by 8 days.

(21) Appl. No.: 10/341,342

(22) Filed: Jan. 14, 2003

(65) Prior Publication Data

US 2003/0107338 A1 Jun. 12, 2003

Related U.S. Application Data

(63) Continuation of application No. 10/291,831, filed on Nov. 12, 2002.

(30) Foreign Application Priority Data

Dec. 12, 2001 (JP) ........................................ 2001-379102

(51) Int. Cl.[7] .............................. H02P 6/00; H02P 6/18
(52) U.S. Cl. ...................... 318/138; 318/254; 318/439; 318/721; 388/911
(58) Field of Search ................................ 318/254, 138, 318/439, 720, 700, 701, 721, 722, 723, 724, 600–605; 388/911, 800, 804, 805, 809, 811, 812, 825, 828, 829; 375/215, 294, 327, 373, 376; 327/147, 156

(56) References Cited

U.S. PATENT DOCUMENTS

| | | | | |
|---|---|---|---|---|
| 4,607,203 A | * | 8/1986 | Bohm et al. ................. | 318/687 |
| 4,651,214 A | * | 3/1987 | Rodriguez-Cavazos | |
| 5,223,772 A | * | 6/1993 | Carobolante ................. | 318/254 |
| 5,254,914 A | * | 10/1993 | Dunfield et al. ............ | 318/254 |
| 5,579,497 A | | 11/1996 | Ehlig et al. .................. | 375/222 |
| 5,619,109 A | * | 4/1997 | Cameron et al. ........... | 318/375 |
| 5,767,654 A | * | 6/1998 | Menegoli et al. ........... | 318/811 |
| 5,850,130 A | * | 12/1998 | Fujisaki et al. ............. | 318/439 |
| 5,990,656 A | * | 11/1999 | Kardash ...................... | 318/807 |
| 6,081,091 A | * | 6/2000 | Mitchell et al. ............ | 318/685 |
| 6,100,656 A | * | 8/2000 | El-Sadi et al. ............. | 318/254 |
| 6,232,730 B1 | * | 5/2001 | Doyama et al. ............ | 318/254 |
| 6,252,362 B1 | * | 6/2001 | White et al. ................ | 318/254 |
| 6,344,721 B2 | * | 2/2002 | Seki et al. ................... | 318/254 |
| 6,452,990 B1 | | 9/2002 | Leis et al. ................... | 375/361 |
| 6,541,928 B2 | | 4/2003 | Eroglu et al. ............... | 318/254 |
| 6,653,805 B2 | | 11/2003 | Menegoli .................... | 318/254 |

FOREIGN PATENT DOCUMENTS

| | | | | |
|---|---|---|---|---|
| JP | 04312388 A | * | 11/1992 | ............. H02P/6/02 |
| JP | 05282046 A | * | 10/1993 | ............. G05D/3/00 |
| JP | 06098585 A | * | 4/1994 | ............. H02P/6/02 |

* cited by examiner

*Primary Examiner*—Robert Nappi
*Assistant Examiner*—Eduardo Colon Santana
(74) *Attorney, Agent, or Firm*—Miles & Stockbridge P.C.

(57) ABSTRACT

A drive control system, with PLL control, drives a rotatable multi-phase sensor-less motor by switching a current of a field coil of each phase depending on the rotating phase of the motor. When the motor is driven, a desired phase is selected as a detection phase, and a voltage induced on the coil of the detection phase is detected when power is fed for a predetermined time to the field coils other than the detection phase. A magnetic pole position is detected from the amplitude condition of the detected induced voltage. Based on this detection, the power-feeding phase of the motor drive is determined. Power feeding and pole position detection are performed alternately.

2 Claims, 12 Drawing Sheets

NOTE 1: ONLY THE PHASE U IS SENSED BECAUSE IT IS ENOUGH TO DETECT THE SWITCHING POSITION OF THE PHASE U

FIG. 12(a) NORMAL OPERATION

FIG. 12(b) IRREGULAR OPERATION

DRIVE CONTROL SYSTEM FOR SENSOR-LESS MOTOR

CROSS-REFERENCE TO RELATED APPLICATIONS

This application is a continuation of Application Ser. No. 10/291,831 filed Nov. 12, 2002.

BACKGROUND OF THE INVENTION

The present invention relates to a drive control system for sensor-less motor and more specifically to the technique which may effectively be applied to the drive control of a brush-less DC multi-phase motor not including a rotation detecting sensor, for example, the technique which can be effectively applied to the drive control of a spindle motor for high speed drive of a disk storage medium (platter) of a HDD (hard disk drive).

The HDD reads or writes information with the seeking and following operations of a magnetic head on a recording surface formed on the surface of platter while the disk type magnetic recording medium called the platter is rotated at a high speed. In order to realize high speed read/write operations of information in this HDD, the rotating speed of platter must be increased.

The platter is driven to rotate with a spindle motor. For this spindle motor, a sensor-less motor is generally used. This sensor-less motor is a brush-less DC multi-phase motor not including a rotation detecting sensor. This motor is suitable, for example, for high speed rotation of a disk type recording medium such as a platter.

The sensor-less motor, can form an effective structure of the motor and drive system thereof since an independent rotation sensor is not used to detect the magnetic pole position of a rotor. Instead, the magnetic pole position of rotor must be detected without use of the sensor. Therefore, the magnetic pole position of rotor is detected, in the sensor-less motor of this type, by utilizing B-EMF (Back Electromagnetic Force) induced on a field coil. B-EMF is a voltage induced on the field coil through the rotation of a rotor. Therefore, when the rotor is in the rotating condition, the magnetic pole position of rotor and rotating speed can be detected by utilizing its B-EMF.

In the case where this sensor-less motor is used as the spindle motor, the motor is driven to rotate with an open loop control and is sequentially subjected to the commutation control and PLL (phase lock loop) control based on the back electromotive force of the field coil in view of holding the motor in the predetermined steady rotating speed condition. The sequence control up to the steady operation from this drive can be conducted with an LSI (semiconductor integrated circuit) system.

SUMMARY OF THE INVENTION

However, the inventors of the present invention have found the technique explained above has following problems.

In other words, in the drive control of a sensor-less motor explained above, the drive control in the steady rotating condition can be realized rather easily with the commutation and PLL controls based on the back electromotive force of field coil, but detection of rotation with the back electromotive force cannot be utilized during the transitional condition until the steady rotating condition is started, particularly immediately after the drive. Therefore, the drive control at the time of starting the motor is executed with the open loop control and when the rotation reaches a certain rotating speed with the open loop control, such open loop control is shifted to the communication and PLL controls. However, since the open loop control is a kind of estimated control method and the estimated operation cannot always be attained. In the prior art, it has been inevitable that a fault is generated at the beginning of drive with a certain probability.

In the sensor-less motor not including a rotation sensor, if a drive mistake occurs, it is difficult to accurately detect such mistake. A drive mistake occurs when the estimated operations are not carried out with a certain reason. Therefore, if a drive error occurs, detection of such drive mistake is not executed as estimated with a considerable probability. In this case, various problems such that recovery from the drive error and re-drive are delayed or the motor is stacked in the non-driven condition may be generated.

Moreover, a problem that shift to the steady operation from drive is not carried out smoothly and the sequence to shift to the drive control of steady operation is executed even when the drive fails has been generated easily.

When the motor is driven successfully and the drive control is shifted to the PLL control, the phase lock of the PLL control is unlocked in a certain case, for example, when a load of motor changes to a large extent. In this case, the motor is stepped out or stops in the worst case. The motor of this type is driven with the PWM-controlled current but when the motor is stepped out, a regeneration current in the PWM drive is returned to the power supply and thereby the power supply voltage rises irregularly, resulting in the possibility of breakdown of the drive circuit.

Loss of synchronization (step-out) due to the unlock of PLL is also generated in some cases when the PWM duty becomes 100% due to reduction of voltage and over-load condition. A spindle motor is subjected to the soft-switch drive or sine-wave drive for smoothly changing over the power feeding phase. In this case, when the PWM duty reaches 100%, a current of the non-power feeding phase cannot be perfectly reduced to zero at the timing near the timing for detecting zero-cross of B-EMF and thereby a kick-back is generated in the drive voltage. Therefore, when the rotating position of rotor is detected with the zero-cross phase of B-EMF, such kick-back prevents accurate detection of the zero-cross phase and thereby such detection error becomes large and PLL is unlocked.

The first object of the present invention is to provide technique for accurately and quickly driving the sensor-less motor.

The second object of the present invention is to provide the technique for accurately monitoring the conditions of the sensor-less motor at the time of drive in order to quickly drive the sensor-less motor with higher reliability.

The third object of the present invention is to provide the technique for quickly realize recovery from a drive mistake and re-drive of motor even when a drive mistake occurs in the sensor-less motor.

The fourth object of the present invention is to provide the technique for quickly realize recovery from a fault condition by accurately detecting unlock of the PLL when the sensor-less motor is successfully driven and shifted to the PLL control condition.

The fifth object of the present invention is to provide the technique for accurately detecting the rotating position of rotor with zero-cross of B-EMF.

The aforementioned and the other objects and features of the present invention will become apparent from the following explanation of this specification to be made with reference to the accompanying drawings.

The typical inventions of the present invention disclosed in this specification can be explained briefly as follows.

The present invention discloses a drive control system for sensor-less motor in which the motor is driven to rotate by switching a current of a field coil in each phase of a multi-phase sensor-less motor depending on the rotation phase of motor and the drive control thereof is subjected to the PLL control. Moreover, immediately after the drive of motor, a desired phase is selected as the detection phase, a voltage induced on the coil of the detection phase when the power is fed only for a short period of time to the field coil in the phase other than the detection phase and the magnetic pole position of rotor is detected from the amplitude condition of the induced voltage detected. Based on this detection, the power feeding phase of motor drive is determined and the power feeding to drive the motor is conducted depending on such determination. The detection of magnetic pole position and the power feeding to drive the motor are conducted alternately. Accordingly, drive of sensor-less motor can be realized accurately and quickly.

DETAILED DESCRIPTION OF THE PREFERRED EMBODIMENTS

The preferred embodiments of the present invention will be explained with reference to the accompanying drawings.

Figure 1:
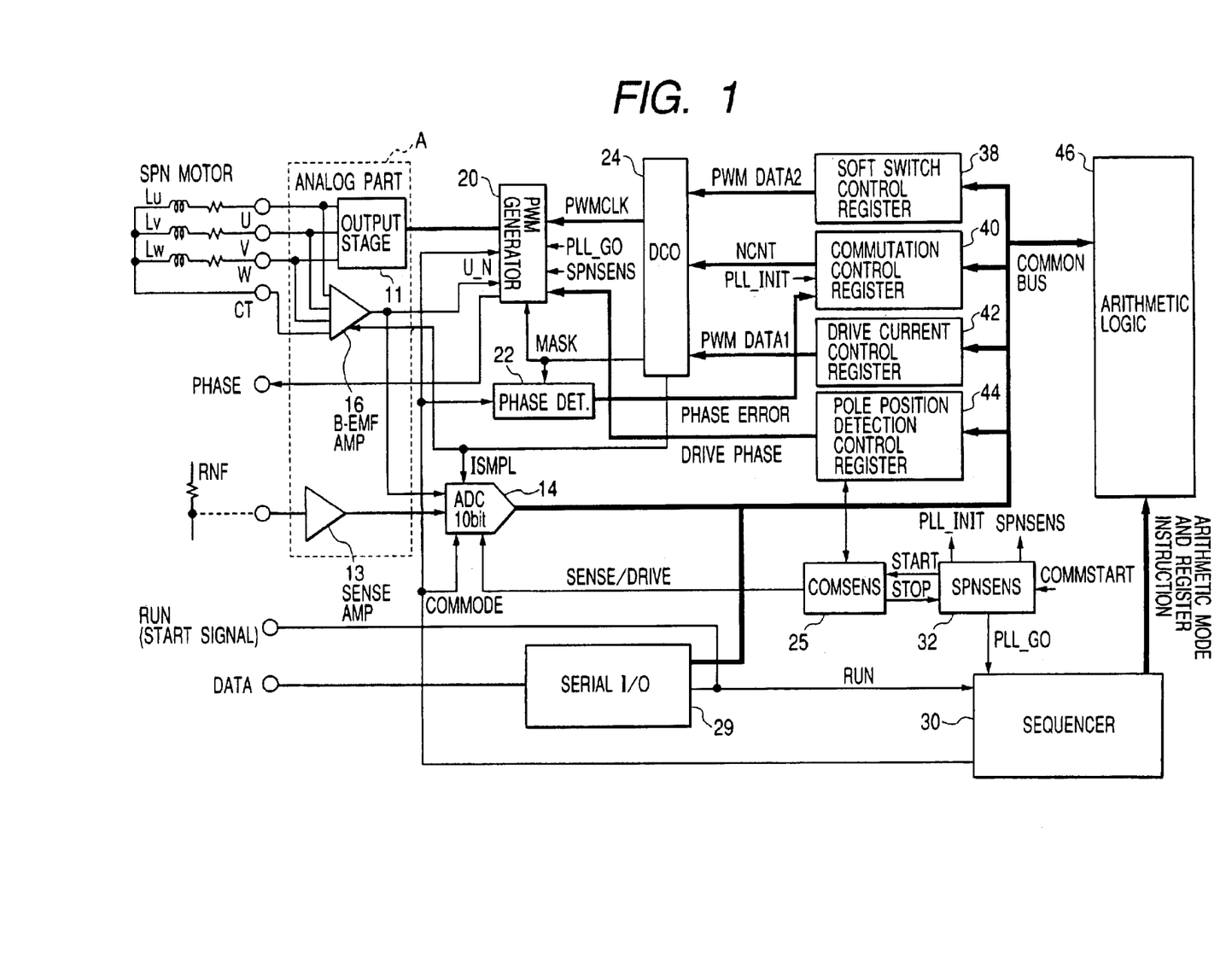
FIG. 1 is a schematic structural diagram illustrating the drive control system for sensor-less motor to which the present invention is applied.

FIG. 1 schematically illustrates the drive control system for sensor-less motor to which the technique of the present invention is applied. The system illustrated in this figure is integrally formed on single semiconductor substrate using single crystalline silicon, except for the field coils Lu, Lv, Lw of motor. Moreover, the system illustrated in the same figure is formed of an analog signal processing part (within the frame of broken line A) and a digital signal processing part (outside of the frame of broken line A). Both circuit portions may be integrated on the single semiconductor substrate or formed separately on different semiconductor substrates as required. In regard to the digital signal processing part, a part or entire part of the function may be formed with a software using a microcomputer.

In FIG. 1, a sensor-less motor as the control object is of the 3-phase system, including the field coils Lu, Lv, Lw in each phase. One ends of the field coils Lu, Lv, Lw of each phase are respectively connected to the analog signal processing part via external terminals. Moreover, the other ends of the field coils Lu, Lv, Lw of each phase are connected in common. The analog signal processing part (within the frame of broken line A) is formed of a motor drive current output circuit 11, a coil voltage detection amplifier 16 and a motor current detection amplifier 13, etc.

The drive current output circuit 11 supplies a 3-phase drive current to the field coils Lu, Lv, Lw of a 3-phase brush-less motor. The coil voltage detection amplifier 16 detects a back electromotive force or an induced voltage generated on the motor coils Lu, Lv, Lw. The motor current detection amplifier 13 preliminarily amplifies a detected voltage of a current (motor current) flowing into the motor coils Lu, Lv, Lw. The motor current is detected through voltage conversion with a current detection resistor inserted in series to the current feeding path of motor. The current detection resistor (RNF) is externally connected via an external terminal. The current detection amplifier 13 preliminarily amplifies a current detection voltage divided to the current detection resistor up to the predetermined level.

The digital signal processing part (outside of frame of the broken line A) comprises an A/D converter (ADC) 14, a PWM pulse generator 20, a DCO (Digital Control Oscillator) 24, a phase difference detector 22, a power feeding phase control circuit 25, a motor rotation control part 32, a sequencer 30, a serial input/output port 29, a soft-switch register 38, a power feeding phase control register 40, a drive current control register 42, a magnetic pole position detection control register 44 and an arithmetic block 46. Respective portions (20, 22, 24, 25, 29, 30, 32, 38 to 46) are mutually connected with the common bus.

The A/D converter 14 switches for digital conversion a motor current detection voltage preliminarily amplified by the current detection amplifier 13 and a back electromotive force or induced voltage preliminarily amplified by the coil voltage detection amplifier 16. The PWM pulse generator 20 PWM-controls a drive current of motor. The DCO 24 generates the reference clock for the PWM control and power feeding phase control. Operation mode of this DCO 24 can be variably set with the soft-switch register 38, power feeding phase control resistor 40, drive current control register 42 and magnetic pole position detection control register 44.

The phase difference detector 22 detects a phase difference between the zero-cross point of the back electromotive force and the zero-cross point of the drive current of each phase of motor. The power feeding phase control circuit 25 executes phase control of the motor drive current by detecting the magnetic pole position of rotor. The motor rotation control part 32 judges the rotating speed at the time of driving the motor and shifts to the acceleration mode with the initial drive when the motor is rotating in the lower speed or stops the rotation, while executes the control such as acceleration with the PLL control when the rotating speed of motor increases to a certain degree.

The sequencer 30 executes the control procedures such as drive and re-drive of motor. In practical, the sequencer 30 controls the operations such as magnetic pole position detection control, power feeding phase control, drive current control and soft-switch control which will be explained later. The serial input/output port 29 exchanges control data (DATA) for external side. The arithmetic block 46 uses registers 38 to 44 to form a main control part for centralized management and control of the operating conditions in the system.

The system explained above forms the function block for the magnetic pole position detection control, power feeding phase control, drive current control, soft-switch control and drive sequence control. Details of these controls will be explained with reference to FIG. 2.

Figure 2:
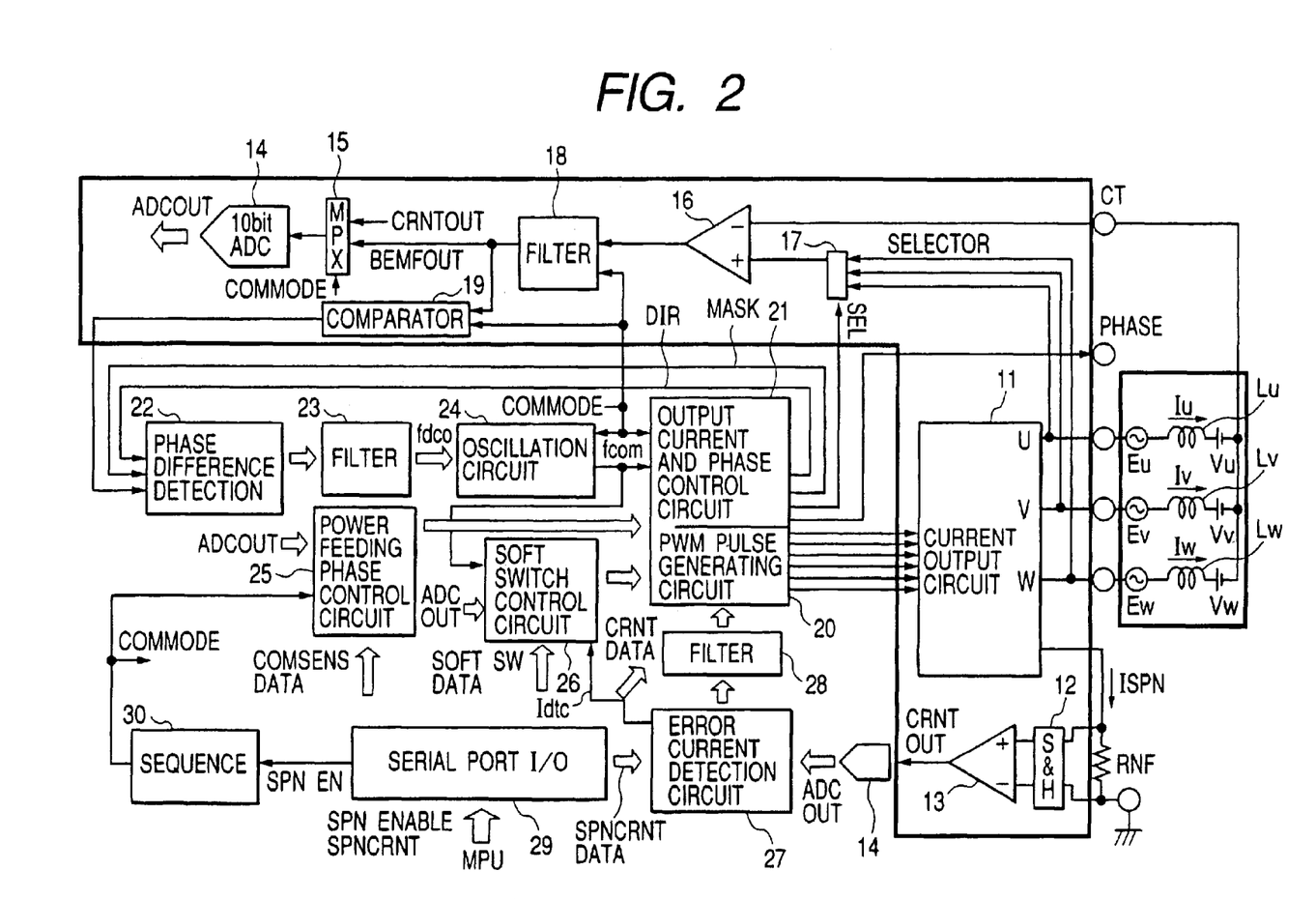
FIG. 2 is a system structural diagram particularly illustrating a part for drive control of motor in the drive control system for sensor-less motor of the present invention.

FIG. 2 illustrates a system structural diagram focusing on the part particularly in regard to the drive control of motor among the drive control system for sensor-less motor of the present invention.

In the same figure, the magnetic pole position detection control block detects the magnetic pole position of rotor by utilizing amplitude change of the induced voltage (Eu, Ev, Ew) generated when the power is fed for a short period of time to the motor coils Lu, Lv, Lw. When the power is fed for a short period of time to any one or two of the motor coils Lu, Lv, Lw, the mutual inductance among the coils Lu, Lv, Lw is modulated with the magnetic saturation phenomenon depending on the magnetic pole position. Accordingly, amplitude of the induced voltage (Eu, Ev, Ew) generated on the coil of non-power feeding phase changes. Based on this changing condition, the magnetic pole position is detected. In this case, the power feeding is conducted with a short pulse current with which the rotor does not react. Consequently, even when the motor is in the stop condition or is rotating at a lower speed and the magnetic pole position cannot be detected based on B-EMF, the magnetic pole position can be detected.

The induced voltage (Eu, Ev, Ew) of the motor coils Lu, Lv, Lw is inputted to the A/D converter 14 via the selector 17, coil voltage detection amplifier 16, analog filter 18 and multiplexer 15. Thereby, the induced voltage is subjected to the digital conversion for each coil. In this embodiment, the A/D converter 14 includes a conversion range of 10 bits and uses this range for the digital conversion of the induced voltage of coil (Eu, Ev, Ew) or back electromotive force (Vu, Vv, Vw) and moreover for digital conversion of the motor current detection voltage which is preliminarily amplified with the current detection amplifier 13. Therefore, in the analog input side of the A/D converter 14, the multiplexer 15 is provided for inputting two analog inputs through the switching process.

The power feeding phase control block performs, in the power feeding phase control circuit 25, the control for determining the power feeding phase of the motor drive current based on the back electromotive force (Vu, Vv, Vw) and the initial acceleration sequence control of motor based on the magnetic pole position detection. To this power feeding control circuit 25 to execute this control, a digital conversion output (ADCOUT) of an induced voltage (Eu, Ev, Ew) and a back electromotive force (Vu, Vv, Vw) is inputted.

While the motor is rotating at the speed higher than the predetermined speed, B-EMF (Vu, Vv, Vw) is generated due to the rotation in each coil Lu, Lv, Lw. The zero-cross point of this B-EMF is detected with a comparator (zero-cross comparator) 19. A phase difference between this zero-cross point and motor power feeding timing is detected with a phase difference detector 22. This detection output is sent to a filter 23 and is then inputted to the DCO 24 as an oscillation frequency control signal (fdco). The filter 23 is provided to enhance an S/N ratio of detection and an influence of high frequency noise can be eliminated by conducting the averaging process through accumulation an error detection output.

An oscillation output (fcom) of the DCO 24 is inputted to a power feeding switching control circuit 21 as the reference clock (CLK) of power feeding control. The power feeding switching control circuit 21 executes the switching of phase (commutation) of the motor drive current based on the reference clock (CLK).

A drive current control block compares the digital-converted motor current detection signal (ADCOUT) with the motor current control signal (SPNCRNT DATA) given externally via the serial input/output port 29 for PWM-control of the motor drive current to make zero an error between both signals. In this case, an error of these signals is detected with an error current detector 27. The detected error is accumulated in a filter 28 to compensate for stability of current control loop and is then averaged. Thereafter, the average error signal is applied to a PWM pulse generator 20 as a control signal for determination of duty. The PWM pulse generator 20 determines, based on above error, an amplitude of the drive current to be applied to the motor coils Lu, Lv, Lw, namely the duty. Accordingly, the duty of motor drive current outputted from the current output circuit 11 is controlled for the feedback.

A motor current detection signal can be obtained by sampling a current detection voltage divided for both ends of a current detection resistor RNF provided in series to a common feeding path of the motor current (ISPN) with a sampling-hold circuit 12 and then amplifying the current detection voltage with an current detection amplifier 13. This amplified output (CRNTOUT) is digital-converted with the A/D converter 14.

A soft switch control block smoothly switches the power feeding phase using a soft switch control circuit 26. The soft switch control circuit 26 generates, with arithmetic operation, an application voltage waveform information for the motor drive current output circuit 11 depending on the detection value of current flowing into the coil. The power feeding phase can be switched smoothly by controlling an output waveform of the motor drive current output circuit 11 with the waveform generated through arithmetic operation. Moreover, in this control block, a phase control signal (fcom) indicating the magnetic pole position and a current control signal (ADCOUT) indicating the drive current are fed back to conduct the control to compensate for the power feeding phase to always generate a higher torque without relation to variation of the drive current.

A drive sequence control block determines the drive sequence of motor by controlling each control block of the magnetic pole position detection control, commutation control, drive current control and soft switch control. Operations of this control block is performed with the sequencer 30 illustrated in the figure.

Figure 3:
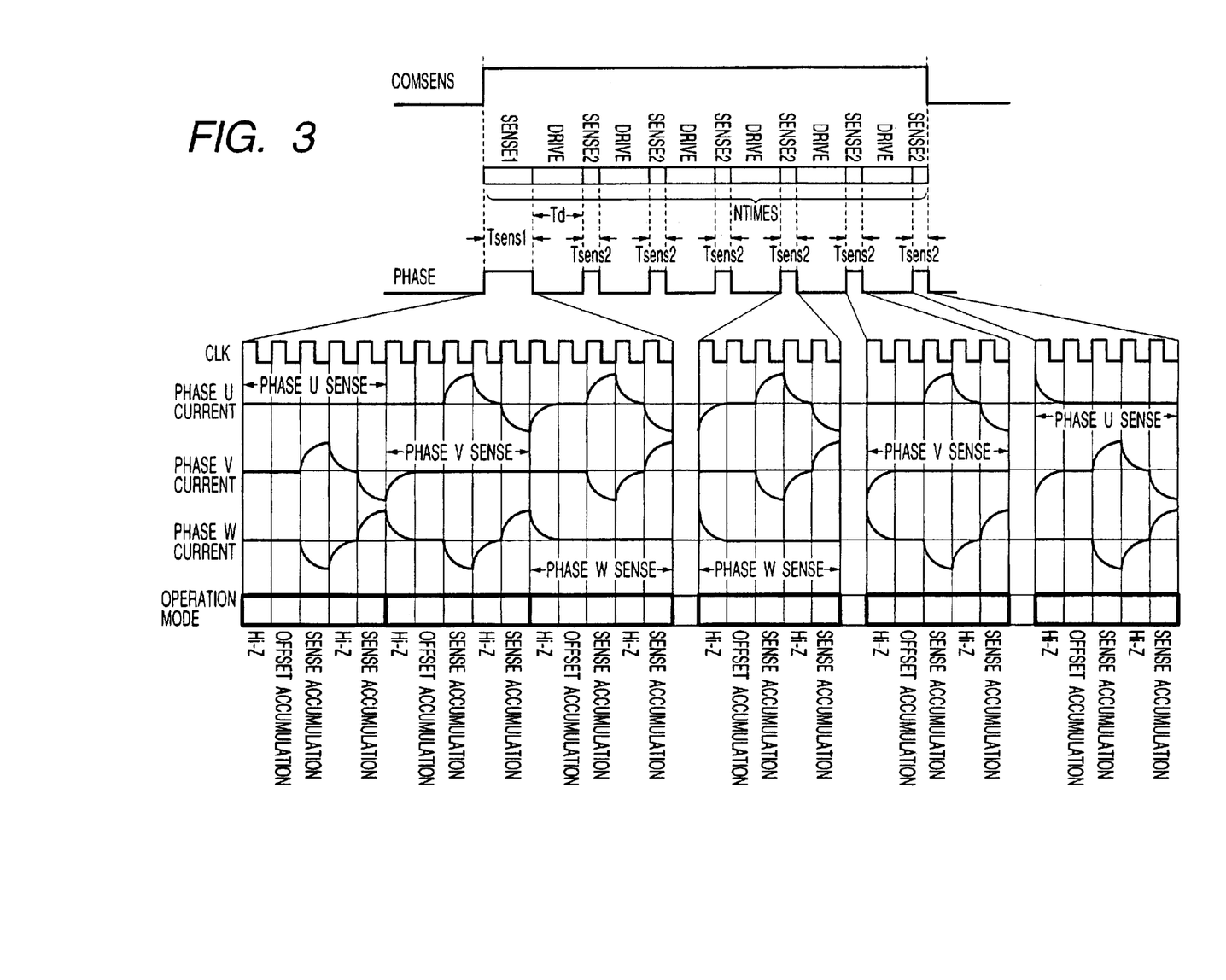
FIG. 3 is a timing chart illustrating schematic magnetic pole position detecting operation performed when the motor is driven.

FIG. 3 is a timing chart illustrating schematic magnetic pole position detecting operation conducted when the motor is driven. The operation illustrated in this figure is executed based on the logic condition of the first and second status signals (COMSENS) and (PHASE). The period where the first status signal (COMSENS) is in the High level indicates the initial drive control section of motor to conduct the magnetic pole position detection control explained above. In this initial drive control section, namely in the period where the first status signal is in the High level, the second status signal (PHASE) alternately repeats the High and Low levels.

In the period where the second status signal (PHASE) is in the High level, the detecting section (SENS1 or SENS2) for determining the power feeding phase through the detection of magnetic pole position is set. Moreover, in the period where the second status signal (PHASE) becomes Low level, the power feeding is conducted to the determined phase for the predetermined period to set the drive section (DRIVE) for accelerating the motor. Namely, detection of magnetic pole position and initial drive of motor are alternately repeated. This condition can be monitored from the external side by externally reading the logic condition of the status signal (PHASE).

The detection section (SENS1) which is set first in the initial drive control section is composed of the phase U sense period, phase V sense period and phase W sense period and the initial value of the magnetic pole position of rotor is detected by sensing all phases. In this sense operation, any one of the 3-phase motor coils LUu, Lv, Lw is defined as the sense phase and the remaining two motor coils are defined as the power feeding phase (excitation phase). The power is fed for a short period of time to the two motor coils in the power feeding phase and an induced voltage appearing on the motor coil of the non-power feeding phase is detected. For example, in the phase U sense period, the power is fed to the motor coils of phases V and W and an induced voltage of the coil of the phase U is detected. In the first detection period (SENS1) of the initial drive control, the sense operation is performed for three phases of U, V and W.

Each sense period is respectively composed of a high impedance output section (Hi-Z) for ceasing excitation of motor coil, an offset accumulation section (offset) for accumulating back electromotive force (B-EMF) and offset of circuit under the same condition and a sense accumulation section for accumulating voltage appearing in the non-voltage feeding phase (sense phase) through excitation with feeding of power to the phase other than the sense phase. Since the voltage signal measured in the sense accumulation section includes the back electromotive force (B-EMF) and circuit offset, only the true induced voltage element appearing in the non-power feeding phase is obtained by subtracting the value measured in the offset accumulation section (offset) from the measured value of the sense accumulation section.

With the sense operation for all phases in the first detection section (SENS1), the magnetic pole position of rotor is detected. The power feeding (excitation) is performed in the subsequent drive section (DRIVE) to generate a forward torque from the detected magnetic pole position. In the detection section to be set after the drive section (DRIVE), namely the second and subsequent detection section (SENS2), the sense operation is performed only for the relevant one phase under the assumption that the motor is forward-driven with the drive section (DRIVE) before this detection section and the phase for power feeding (excitation) in the next drive section (DRIVE) is determined based on the result of sense operation explained above.

As explained above, even if the rotor is not in the rotating condition or in the rotating condition in the too lower speed to detect the magnetic pole position with the back electromotive force, the magnetic pole position of rotor can be detected. Therefore, the motor can also be driven by feeding the power for drive after determining the phase to be driven based on such detection of magnetic pole position of rotor. If the motor is not driven in the first drive section, the motor can be driven with very high probability by alternately repeating, as explained above, the detection section and drive section.

Figure 4:
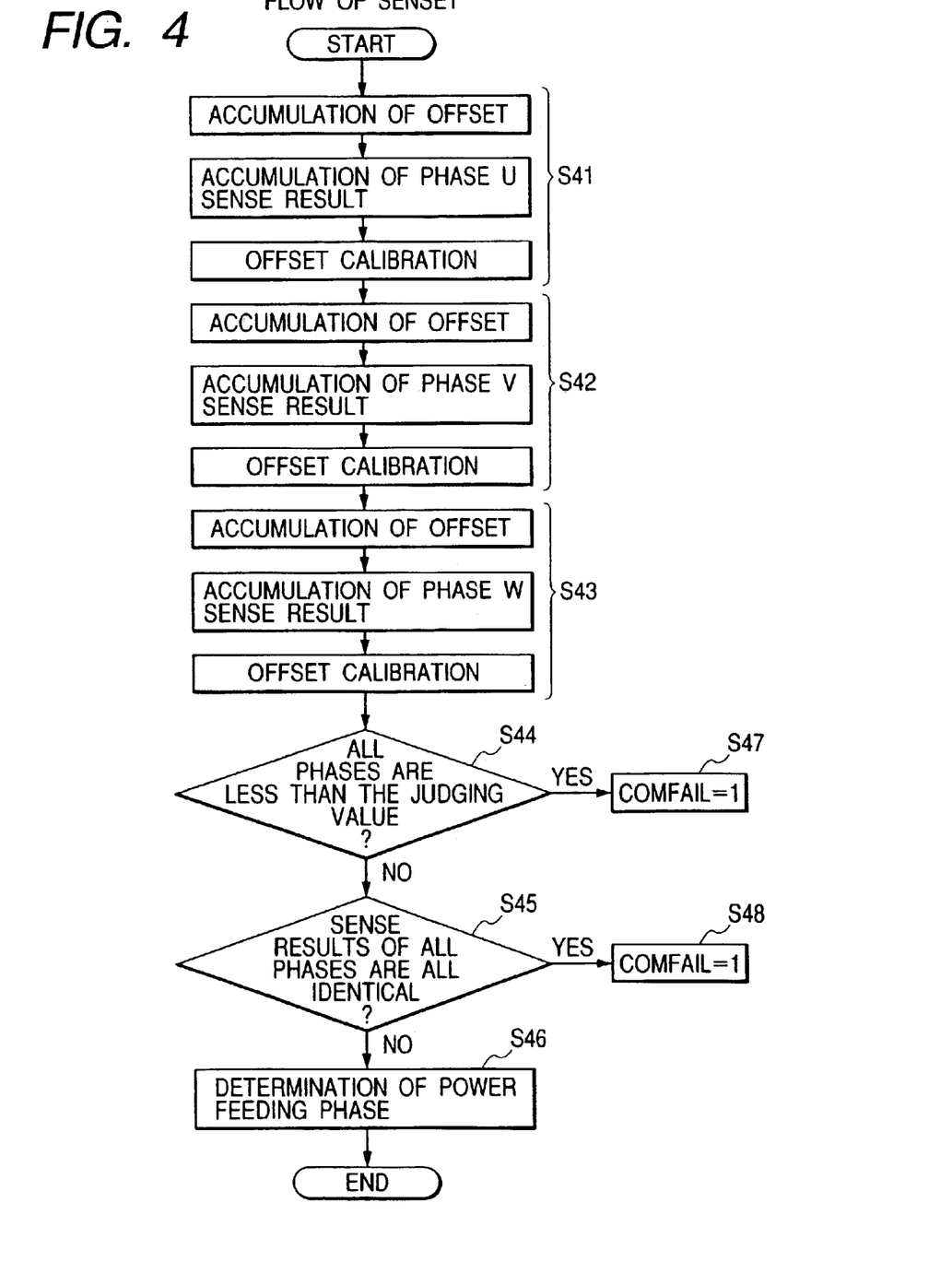
FIG. 4 is a flowchart illustrating the procedures of detection of magnetic pole position and determination of power feeding phase executed in the first detection section.
Figure 5:
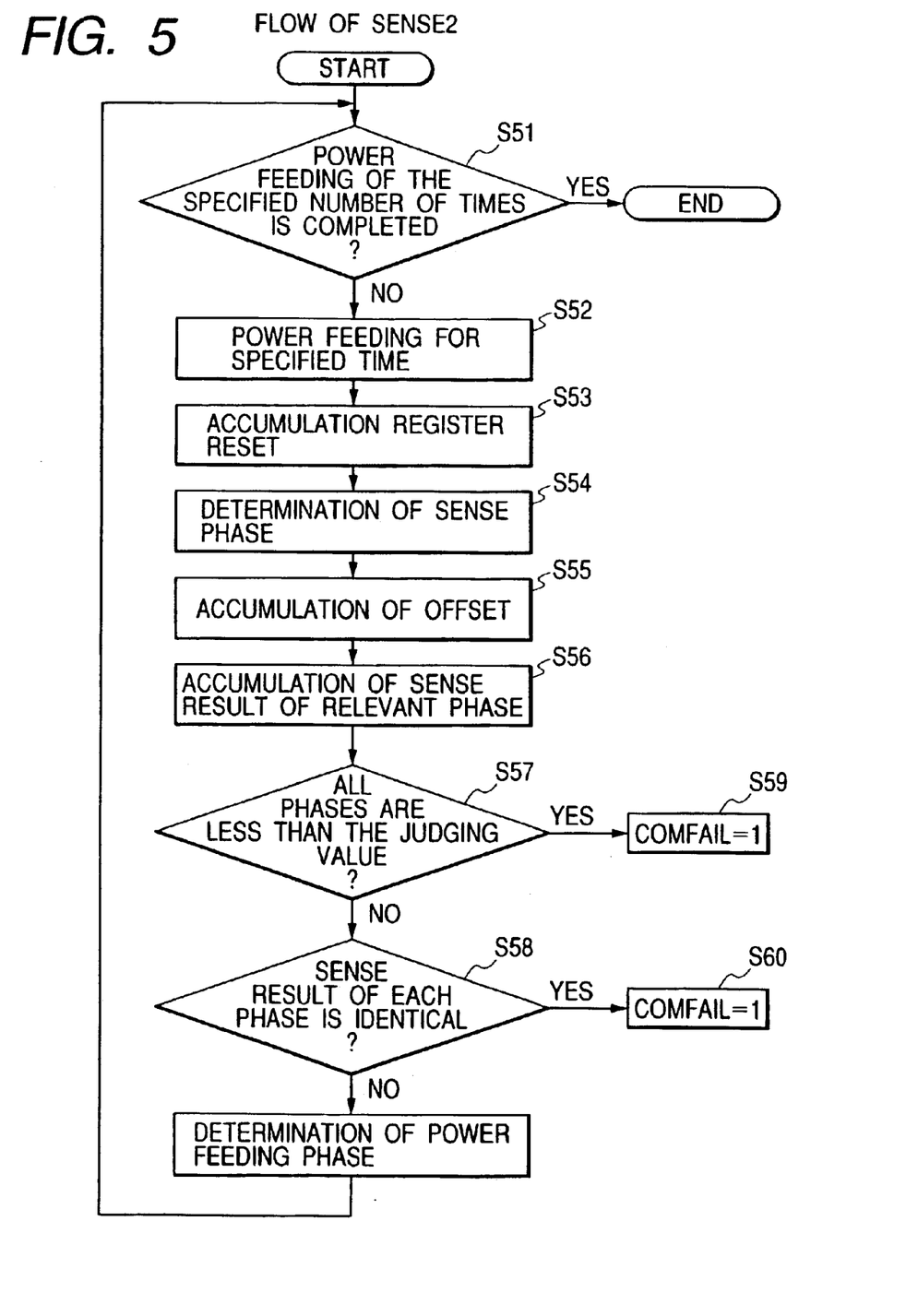
FIG. 5 is a flowchart illustrating the procedures of detection of magnetic pole position and determination of power feeding phase executed in the second and subsequent detection sections.
Figure 6:
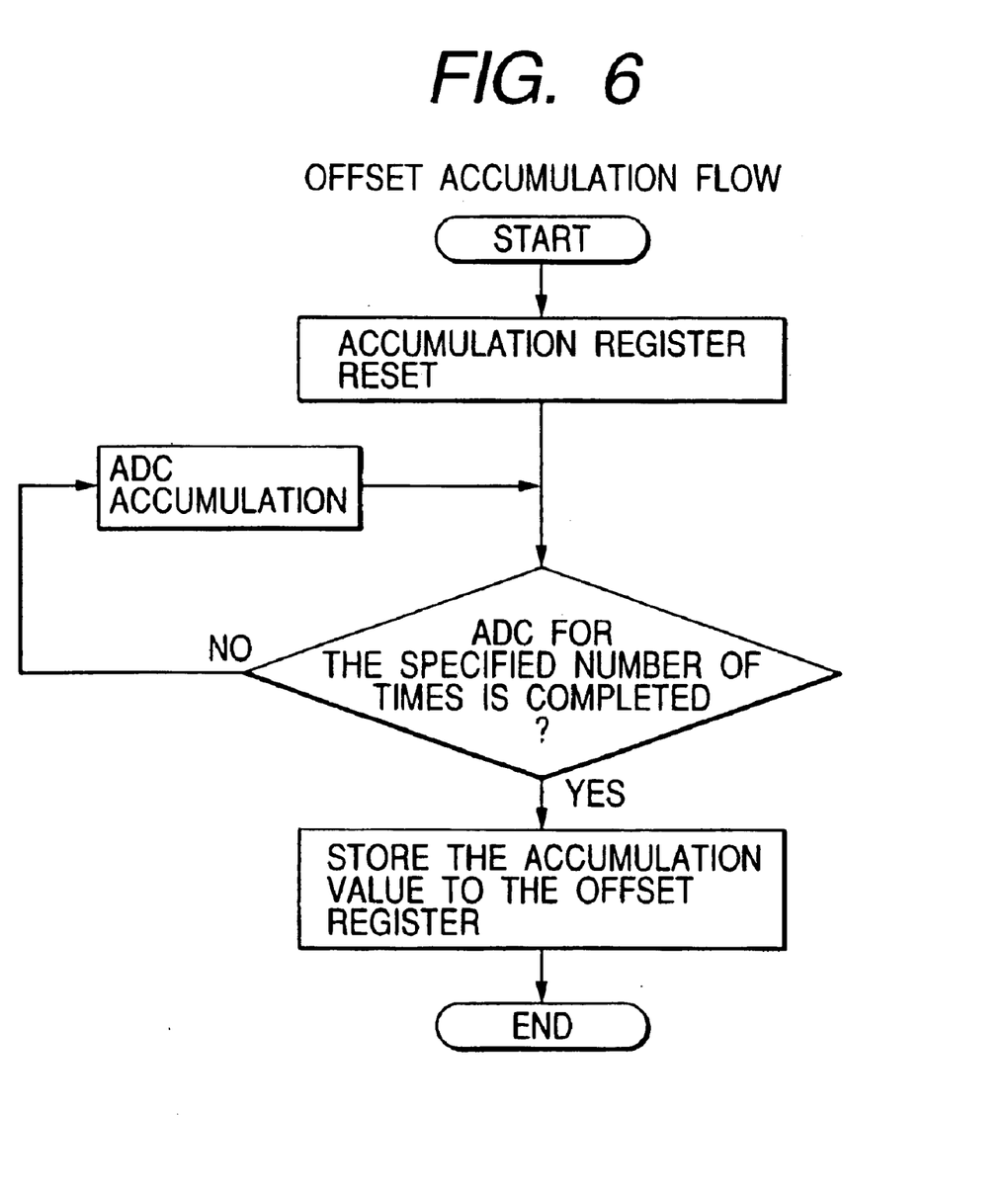
FIG. 6 is a flowchart illustrating the procedures of offset accumulation process.
Figure 7:
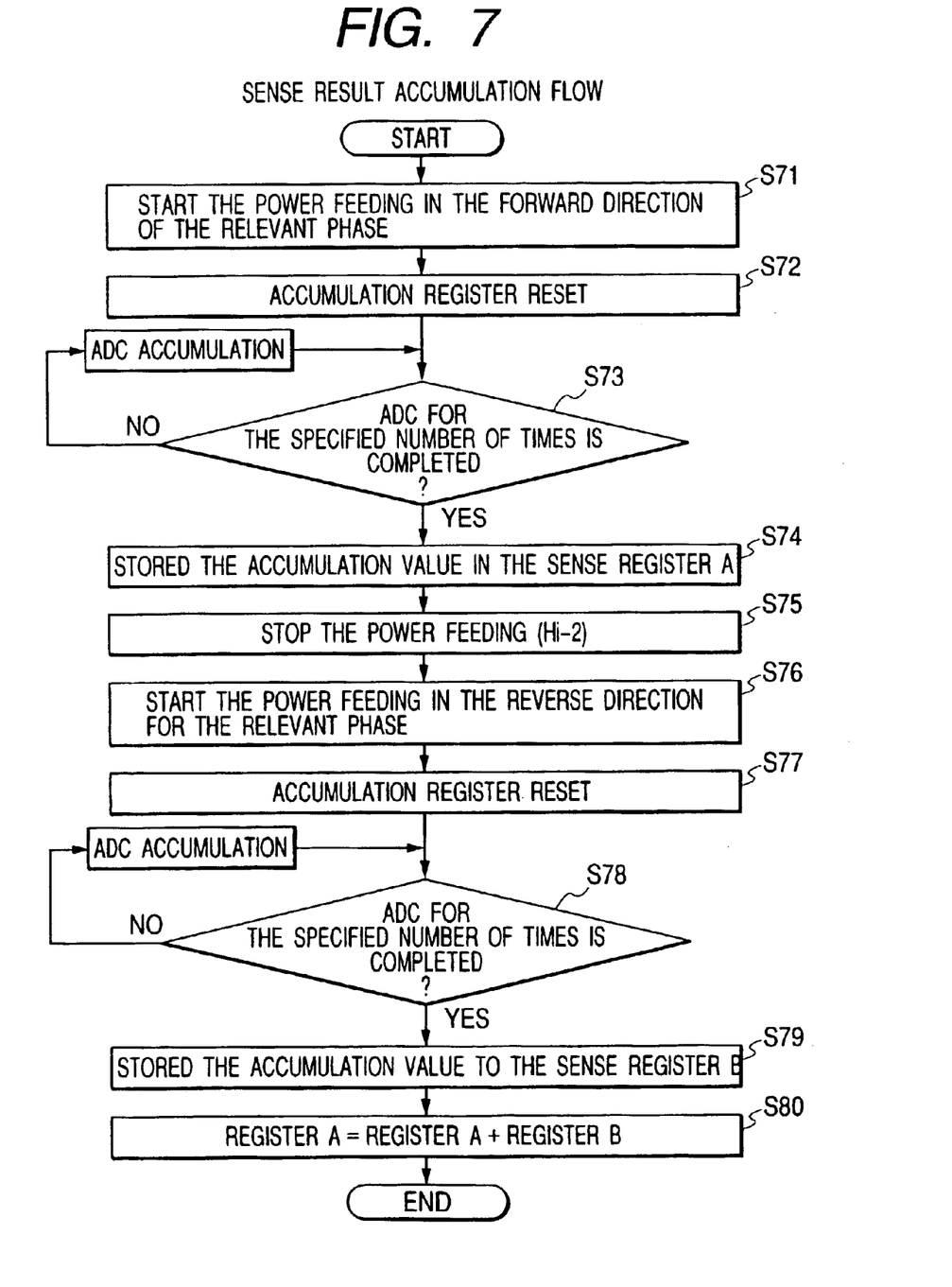
FIG. 7 is a flowchart illustrating the procedures of sense result accumulation process.

FIGS. 4 to 7 illustrate flowcharts of the sequence of detection of the magnetic pole position and determination of power feeding phase. In this case, FIG. 4 illustrates the sequence of detection of the magnetic pole position and determination of power feeding phase to be executed in the first detection section (SENS1). FIG. 5 illustrates the sequence of detection of the magnetic pole position and power feeding phase to be executed in the second (SENS2) and subsequent detection sections. FIG. 6 illustrates the offset accumulation process sequence. FIG. 7 illustrates the sense result accumulation process sequence.

The sequences of detection of magnetic pole position and determination of power feeding phase to be executed in the first detection section (SENS1) executes first, as illustrated in FIG. 4, the offset measurement for measuring and accumulating the offset values for the predetermined number of times in regard to the sense phases of U, V and W, sense measurement for measuring and accumulating an induced voltage for the predetermined number of times, and calibration for measuring only the true induced voltage element by subtracting the measured and accumulated value of offset from the measured and accumulated sense value (S41 to S43). Thereby, the sense values of the induced voltages for all three phases can be obtained (full-scan mode)

Next, whether all sense values are lower than the predetermined threshold value or not is judged for the sense values of all phases (S44) and whether the sense values of all phases are identical or not is also judged (S45). When the magnetic pole position by sense of three phases is normally detected, a sense value of an induced voltage of any one phase is always larger than the predetermined amplitude level (threshold value). Therefore, the magnetic pole position can be theoretically judged from the phase of which sense value indicates the larger amplitude. Based on this result of judgment, the power feeding phase for driving the rotor to rotate in the specified direction (normal rotating direction) can be determined (S46) Amplitude of the sense value is determined by the two-level judgment of High and Low level.

When all sense values of induced voltages of three phases are amplitudes less than the predetermined level when the sense is completed, the magnetic pole position cannot be judged. In this case, the sense is assumed to be failed and a fault flag COMFAIL is set (S47).

Moreover, even if the sense values of induced voltages of three phases are higher than the predetermined level, when the sense values are all identical, the magnetic pole position cannot be judged. Accordingly, in this case, a fault end flag COMFAIL is also set (S48).

As explained above, in the detection of magnetic pole position, it can be known with the fault end flag COMFAIL that detection of magnetic pole position is failed. Therefore, measures such as re-setting of detected parameter (sense accumulation time) and displacement of initial position due to the control for power feeding phase of open loop can be executed quickly by monitoring the condition of flag COMFAIL. Accordingly, reliability for drive of motor can be enhanced.

Detection of magnetic pole position explained above is realized by utilizing the fact that when the power is fed for a short period of time to the motor coil, amplitude of the voltage induced by the mutual induction effect in the non-power feeding phase changes depending on the magnetic pole position of the rotor. In this embodiment, it is utilized that the induced voltage changes depending on the magnetic saturation characteristic of the mutual inductance of coil.

Sequence of detection of magnetic pole position and determination of power feeding phase to be executed in the second section and subsequence sections (SENS2) is executed in the single sense motor to sense only one predetermined phase as illustrated in FIG. 5. At the time of initially driving the motor, the full-scan SENS1 must be executed because the magnetic pole position of motor is uncertain, but when the power feeding phase is once determined, the phase to be switched next can be uniquely determined. Therefore, the desired phase switching position can be determined by sensing only one phase in the magnetic pole position detection.

In FIG. 5, whether power feeding for drive to be executed after detection of magnetic pole position is conducted exceeding the specified number of times or not. When less than the specified number of times, the power feeding for drive is conducted to the power feeding phase determined on the basis of the preceding detection of magnetic pole position (S51, S52).

After power feeding for drive, an accumulation register for measurement is reset and only one sense phase for measuring an induced voltage is determined (S53, S54). The sense phase can be determined uniquely from the result of the preceding detection of magnetic pole position.

The offset measurement for accumulating the offset values by conducting measurement for the predetermined number of times is executed for the motor coil of the determined sense phase (S55). Next, the sense measurement for accumulating the induced voltages for the predetermined number of times is conducted and calibration is also conducted by measuring only the true induced voltage element by subtracting the measured and accumulated value of offsets from the measured and accumulated value of sense (S56). When the motor rotates to generate a back electromotive force, only the induced voltage after subtraction of the back electromotive force can be measured by executing calibration.

Thereafter, whether the fault end flag COMFAIL is set or not is judged by comparing the induced voltage sense values of three phases. In this detection section (SENS2), only the induced voltage of one phase determined depending on the result of preceding detection of magnetic pole position is sensed. Therefore, the sense values of the other two phases as the comparison object use the result of measurement in the preceding detection of the magnetic pole position.

When the sense values of induced voltages of three phases when the sense is completed are all amplitudes which are lower than the predetermined level, the magnetic pole position cannot be judged. In this case, the sense is assumed to be failed and a fault end flag COMFAIL is set (S57, S59). Moreover, even when the sense values of induced voltages of three phases are higher than the predetermined level, if the sense values are all identical, the magnetic pole position cannot be judged. In this case, therefore, a fault end flag COMFAIL is set (S58, S60).

Since only the sense phase is considered in the second and subsequent sections (SENS2), the upper limit of rotating speed in the initial drive can be raised by shortening the sense period. When the upper limit of rotating speed in the initial drive is raised, a B-EMF generated in the motor becomes large to assure the initial drive and the shift to the steady rotation by the PLL control can be realized smoothly. Moreover, since a ratio of the power feeding time to the sense time can be increased, a merit that the upper limit of rotating speed can be attained within a shorter period of time can be obtained. In addition, since higher the rotating speed when the initial acceleration is completed, the higher the amplitude of back electromotive force (B-EMF) becomes, unlock due to the PLL control by detection of the back electromotive force in the next step becomes difficult to occur and thereby reliability of drive can be enhanced.

In the offset accumulation sequence, as illustrated in FIG. 6, after the offset accumulation register is initialized (reset), the digitalized measured values are accumulated for the predetermined number of times and are then stored in the offset accumulation register. With accumulation of the measured values, detection sensitivity and accuracy may be increased by reducing influence of high frequency noise and jitter or the like.

In the sense result accumulation process sequence, the forward power feeding is started for the coil of the relevant phase in order to detect an induced voltage (S71). Simultaneously, the first accumulation register A is reset as the preparation for storing a new accumulated value (S72). Under the forward power feeding condition, the measured values detected from the coil of the non-power feeding phase and converted to the digital values are then accumulated for the predetermined number of times (S73). This accumulation result is stored in the first accumulation register A (S74).

Next, after the power feeding is paused for the predetermined time, the backward power feeding is started for the coil of the relevant phase to detect an induced voltage (S75, S76). Simultaneously, the second accumulation register B is reset as preparation for storing a new accumulated value (S77). Under the backward power feeding condition, the measured values detected from the coil of non-power feeding phase and converted to the digital values are accumulated for the predetermined number of times (S78). This accumulation result is stored in the second accumulation register B (S79)

A result of addition of contents of the second accumulation register B to the first accumulation register A is stored to the first accumulation register A (S80). Thereby, the accumulation results of induced voltage detected respectively by the forward and backward power feedings are added and polarity of induced voltage can be judged from the added sense value. Namely, whether the induced voltage has been amplified in the High level side, or in the Low level side or not amplified in the High and Low level sides. When the amplitude is detected normally, the sense value may be judged as the High level or Low level. However, it is also possible that if a detection error is generated, the sense value is not jugged as normal/negative (H/L) level.

Figure 8:
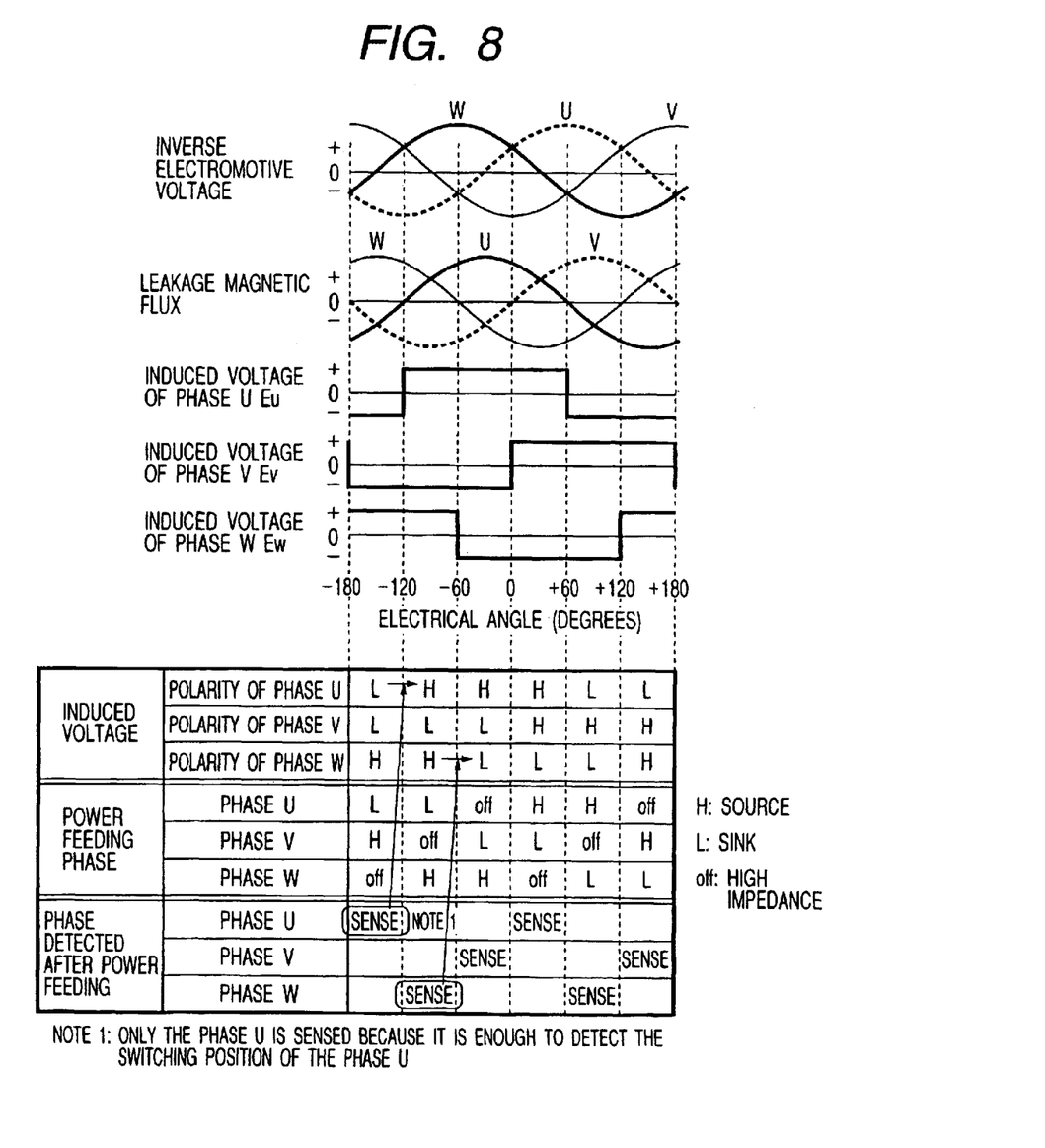
FIG. 8 is a truth value table illustrating variable conditions of the power feeding phase and sense phase when an induced voltage is detected normally.
Figure 9:
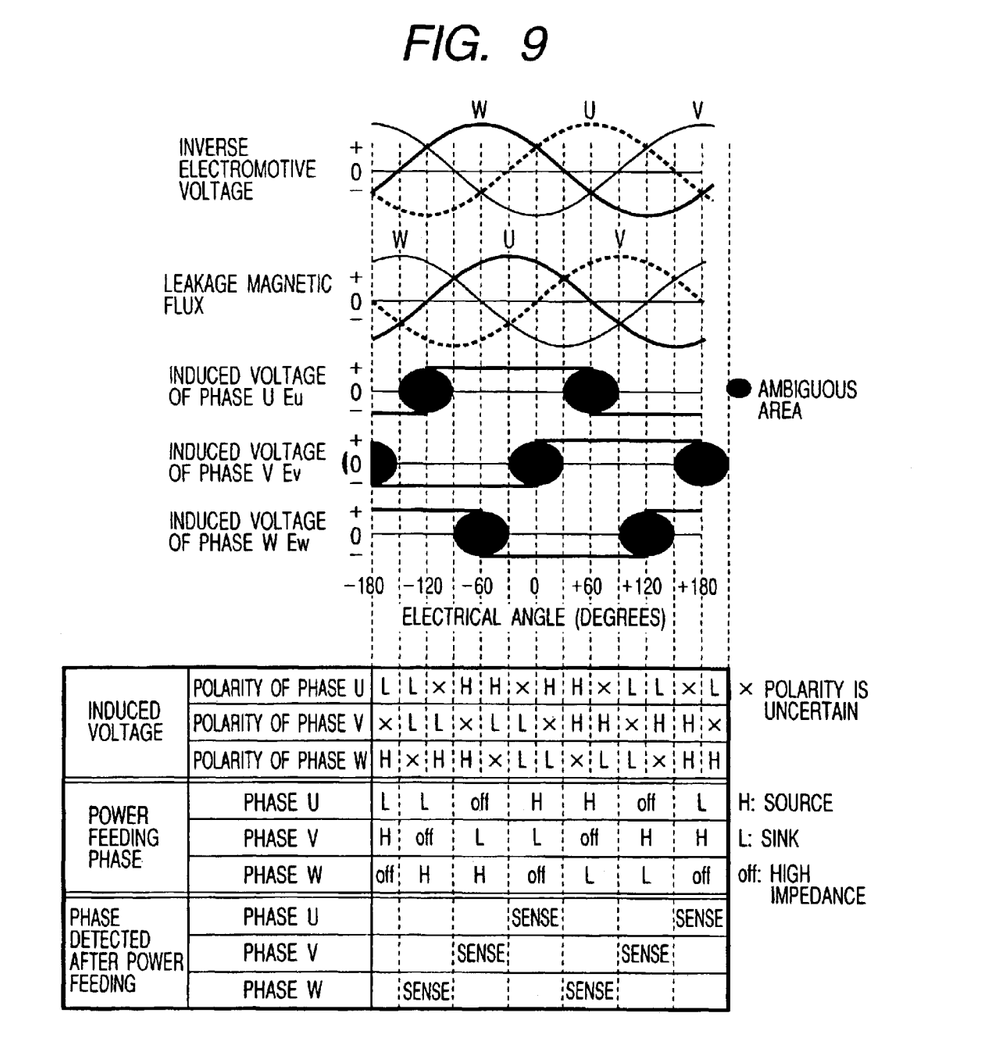
FIG. 9 is a truth value table illustrating variable conditions of the power feeding phase and sense phase when a part of the induced voltage is unclear.
Figure 10:
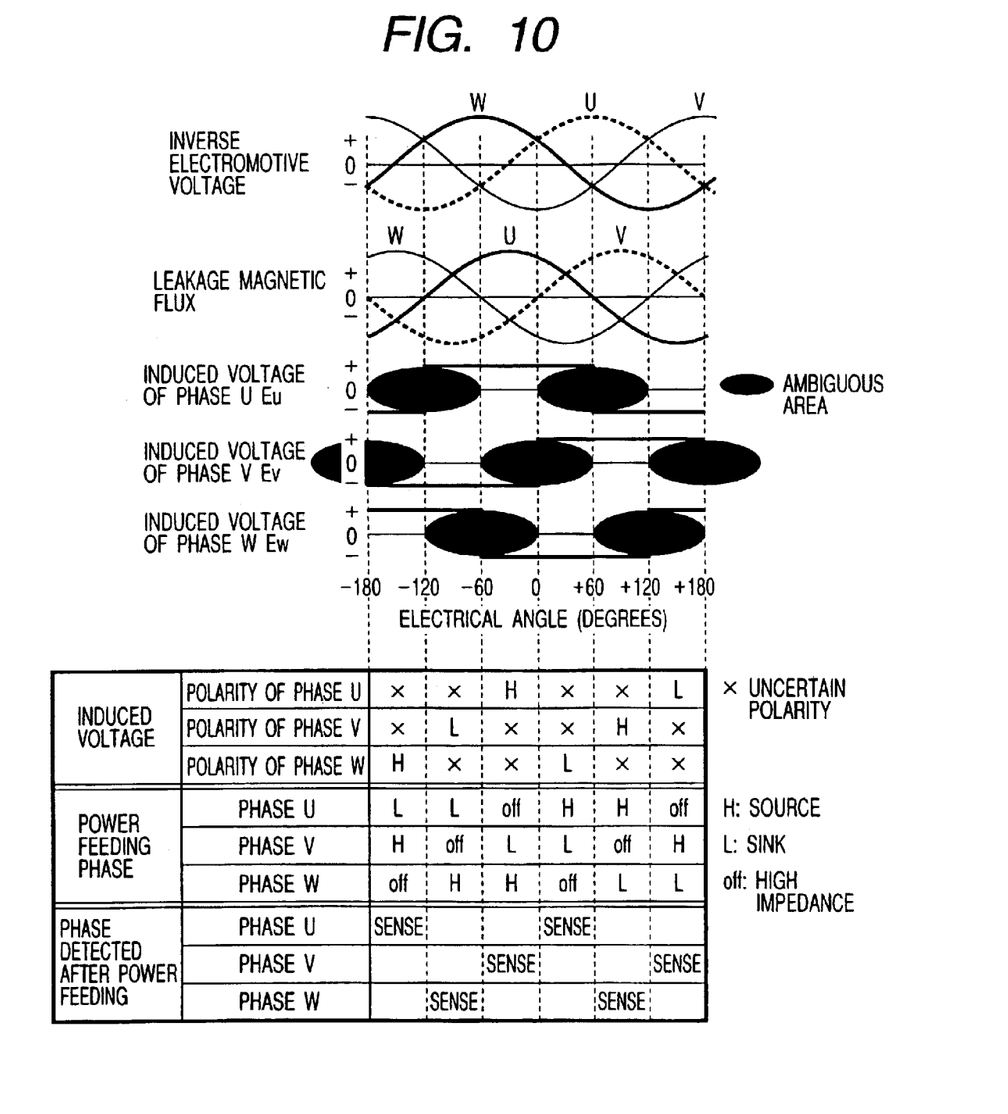
FIG. 10 is a truth value table illustrating variable conditions of the power feeding phase and sense phase when a larger part of the induced voltage is unclear.

FIG. 8 to FIG. 10 illustrate the truth value table for the relationship between the power feeding phase and sense phase when the motor is driven. As explained previously, the detection of magnetic pole position and power feeding for drive are alternately conducted when the motor is driven to rotate, but second and subsequent detections of magnetic pole position may be conducted by detecting the induced voltage of any one phase. In this case, determination of sense phase can be set depending on the predetermined logical rule as respectively illustrated in FIG. 8 to FIG. 10. Namely, when the motor is driven to rotate in the constant direction, polarity of induced voltages of U, V and W phases sequentially changes phase by phase depending on the preceding detection result of the magnetic pole position.

FIG. 8 illustrates changing conditions of the power feeding phase and sense phase (phase detected after power feeding) when the induced voltage is normally detected in any polarity of the positive/negative (H/L) polarities. In this case, first, the power feeding phase is determined based on the preceding detection result of the induced voltage and the power feeding for drive is conducted in this determined power feeding phase. After the power feeding for drive, the sense phase is determined for detection of induced voltage. In this case, the detection phase can be determined based on the just preceding power feeding phase.

For example, when the detection result of induced voltage of each phase detected in the preceding detection of magnetic pole position is phase U=L, phase V=L, and phase W=H, the drive power feeding phase determined based on this detection result becomes phase U=L (sink), phase V=H (source), and phase W=off. In this case, detection of induced voltage after the power feeding for drive is executed for the phase U because the phase of which polarity of induced voltage changes next can be assumed as the phase U.

When the power feeding for drive is executed at the magnetic pole position where the induced voltage becomes L for the phase U, L for the phase V and H for the phase W, the polarity changes only in the phase U and polarity change of induced voltage does not occur in the phases V and W. Therefore, in this case, it is enough that whether polarity changes as assumed or not is judged by detecting only the induced voltage of phase U. As explained above, when only one phase of induced voltage is detected after the power feeding for drive, the power feeding phase and detection phase can be determined alternately.

However, detection of induced voltage is not always executed successfully. For example, in an example of FIG. 7, even when the rising/falling waveform of the induced voltage is ideal waveform, detected polarity of induced voltage cannot be judged as H or L in some cases because the transitional rising/falling waveform is destroyed actually if the detected sensitivity is insufficient.

For example, as illustrated in FIG. 9, the rising/falling condition of induced voltage is ambiguous and uncertain polarity (indicated by the symbol x), neither H nor L, of the induced voltage is detected at the area near the rising/falling edge. However, even in this case, the power feeding phase and detection phase may be uniquely and theoretically judged based on the preceding processes. Moreover, the detection phase of induced voltage after such power feeding can also be determined.

FIG. 10 illustrates the condition where ambiguous region of induced voltage is further expanded and the polarity of induced voltage becomes uncertain in the half of electrical angle of 360 degrees (−180 degrees to +180 degrees). Even in this case, the power feeding phase and detection phase can also be judged uniquely and theoretically based on the preceding processes.

The theoretical judgment explained above may be realized very easily and quickly by preparing the induced voltage detection pattern and time series change pattern of power feeding phase and detection phase in the shape of the logical table. Moreover, when contents of such logical table is not fixed, allowing write-setting by user using a programmable non-volatile memory such as a flash memory, it is now possible for user to program as desired the setting of control condition, for example, to such degree ambiguity of polarity of induced voltage should be allowed or when to which degree ambiguity of polarity of induced voltage is expanded, an error should be defined.

Figure 11:
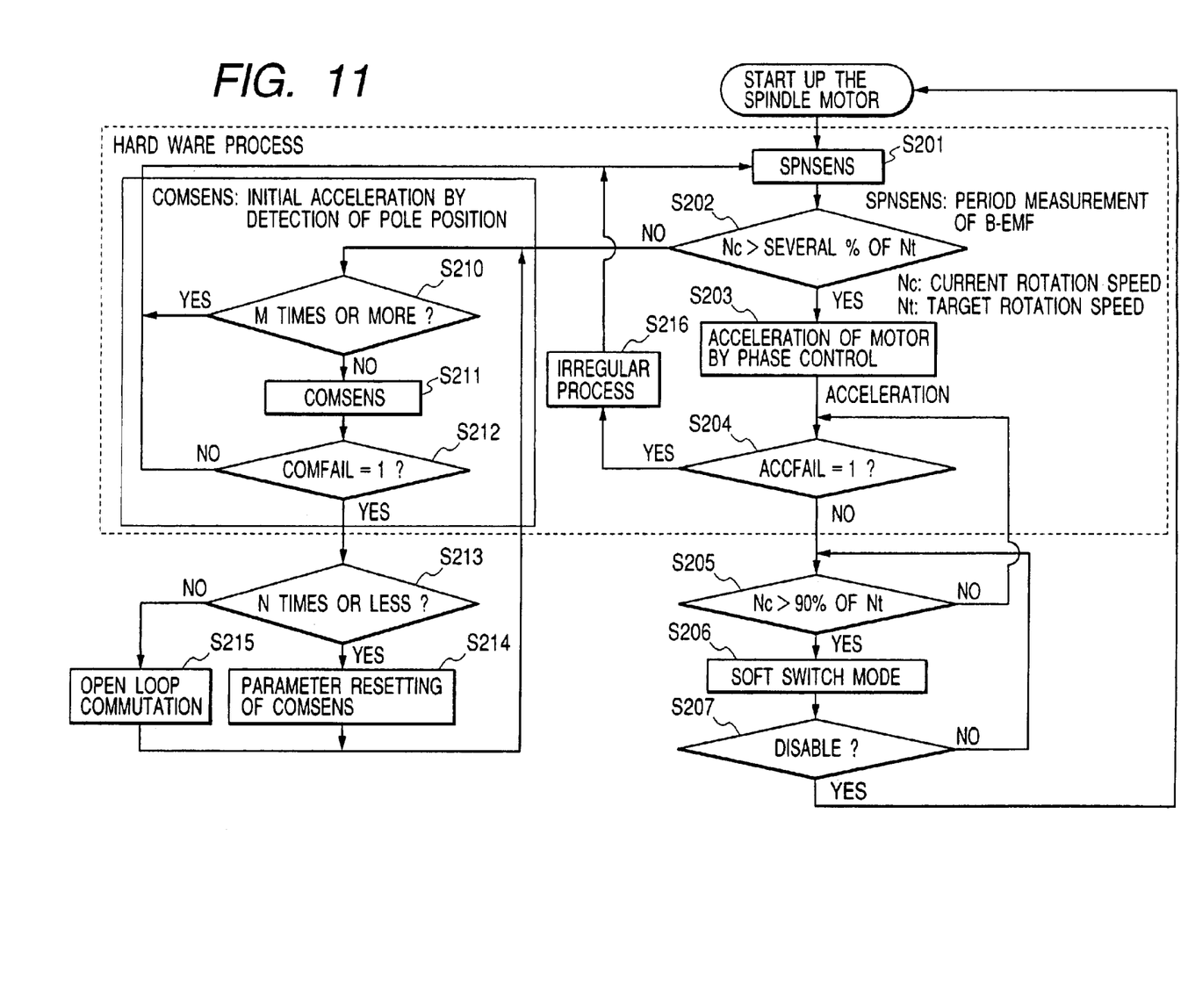
FIG. 11 is a flowchart illustrating procedures up to the steady rotation from the drive of motor.

FIG. 11 illustrates a flowchart of sequence up to the steady rotation from drive of motor by the motor drive control system explained above.

In this figure, when a motor drive command is issued, the period of B-EMF of coil is detected first to detect the rotating speed (rotating frequency) of motor (S201) considering issuance of motor drive command after the power failure occurs momentarily and such power failure is recovered. This drive command is generated usually when the motor is in the stop condition but is not always limited thereto.

Therefore, in the next step (S202), it is judged whether the rotating speed of motor is only a several percents (for example, 3%) of the target speed (Nt) or not in order to execute the steady rotation control (S203 to S207) with the PLL control or execute the drive sequence (S210 to S215).

In the steady rotation control, rotation of motor is accelerated with the power feeding phase control in the PLL control (S203). In this case, unlock of PLL is monitored (S204). Unlock of PLL can be judged, as explained later, with the zero-cross timing of B-EMF. While the PLL control is executed normally, a constant timing relationship is maintained between the switching of power feeding phase and zero-cross point of B-EMF, but if the PLL control is no longer executed normally, a fault is generated in such timing relationship. When unlock is judged as explained above, a flag (ACCFAIL) indicating generation of fault is set and the process shifts to the predetermined fault process routine (S216) including the head drawing process or the like.

Moreover, when the motor rotating speed is higher, for example, 90% of the target speed, the motor is judged to reach the steady rotation, the soft switch control is executed to assure smooth commutation of the power feeding phase (S205, S206). The soft switch control makes smooth the commutation of power feeding phase and realizes low noise drive and low torque ripple. Moreover, the soft switch also has a function to compensate for the power feeding phase to always generate a higher torque, without relation to change of drive current, by feeding back the phase control signal (fcom) indicating the magnetic pole position and the current control signal (ADCOUT) indicating the drive current as the control information. If the phase control by the soft switch control is disabled, the process returns to the step S201 for the repeated drive.

Meanwhile, when the motor is in the stop condition or is rotating in the too lower speed to realize acceleration by the PLL control, the drive sequence (S210 to S215) is executed. In this drive sequence, the initial acceleration (COMSENS) by detection of magnetic pole position is executed for the predetermined number of times (M times) (S210 to S212). In this case, every time when the initial acceleration is conducted once, the process returns to the process routine (S201), it is checked whether the motor rotating speed has been accelerated with the initial acceleration up to the speed which may be accelerated with the PLL control or not. Thereby, the initial acceleration can be completed without repletion of useless initial acceleration (COMSENS).

When the initial acceleration (COMSENS) fails (COMFAIL=1), following recovery processes are selectively executed. In one recovery process, since failure of initial acceleration is resulting from inadequate accuracy of magnetic pole position detection, the parameter settings such as increase of current during detection and change of detection interval are changed (S214). Thereafter, the initial acceleration is executed again from the beginning. This process is selected when the number of times of re-trial process of initial acceleration process (S210 to S212) is less than the predetermined value (N) (S213).

When the number of times of re-trial process of the initial acceleration process (S210 to S212) has exceeded the predetermined number of times (N), since it is highly probable that the rotor stops at the position to easily generate an magnetic pole position detection error, the rotor is displaced with the open loop control (S215). Thereafter, the initial acceleration is started again from the beginning.

In the control explained above, it is recommended that the target speed (Nt), upper limit in number of times of re-trial (N), and shifting condition and branching condition (for example, M) to and from the drive sequence (S210 to S215) are stored in a non-volatile memory such as flash memory for the user to desirably change the settings. Moreover, any one routine may be necessary for the steps S214 and S215 and it is therefore recommended to variably set these routines from external side.

In the sequence explained above, since the process returns to the first routine (S201) to check the success of the initial drive whenever the initial drive is executed once, recovery from the fault condition may be realized quickly and adequately to improve the reliability of system.

Figure 12A:
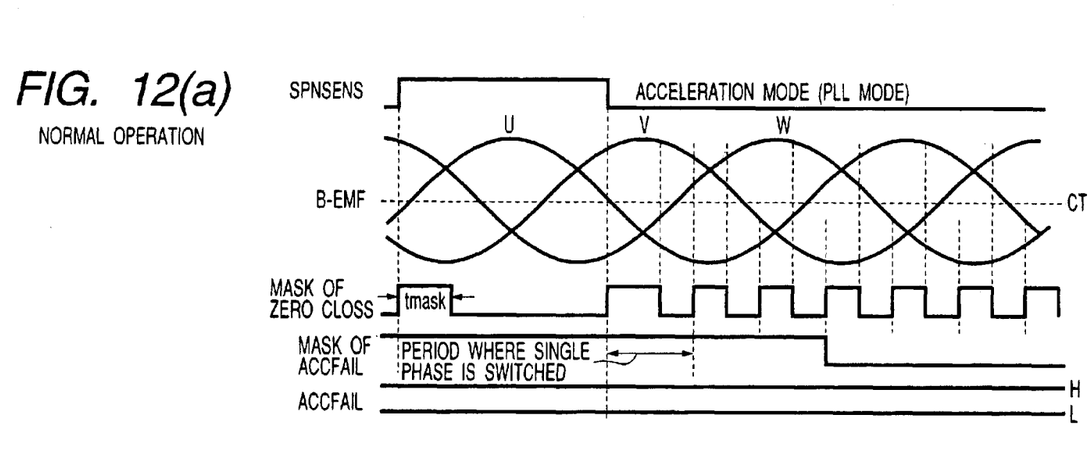
FIGS. 12(a) and 12(b) are waveform-charts illustrating the process to detect unlocking of the PLL control.
Figure 12B:
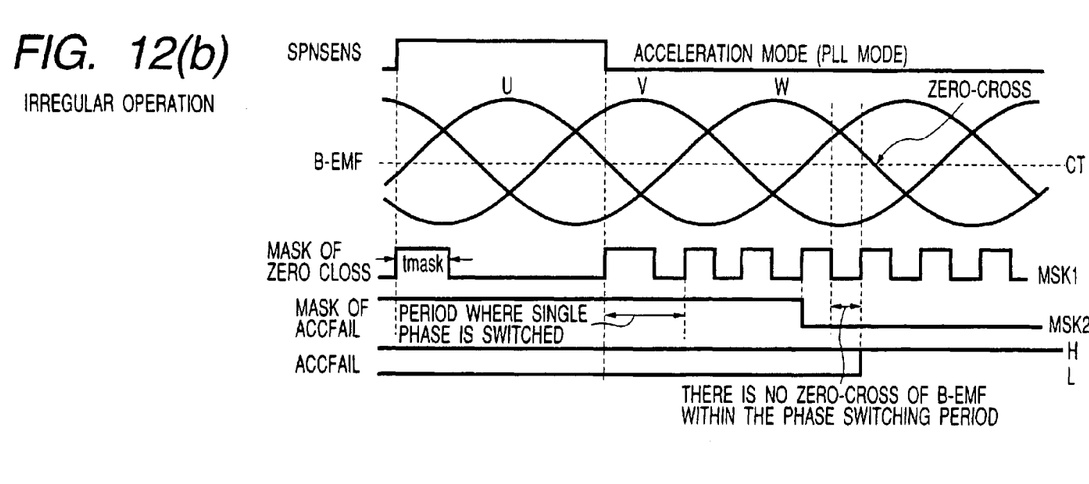

FIGS. 12(a) and 12(b) illustrate waveform charts for explaining the process to set a fault judgment flag (ACCFAIL=1) by detecting unlock of the PLL control in the drive sequence explained above. In this figures CT indicates the reference level of zero-cross detection.

In the same figures when the PLL control is performed normally, back electromotive force generated by rotation of motor indicates zero-cross within the switching period of the power feeding phase because the power feeding phase is switched based on the back electromagnetic force. When the power feeding phase is switched normally under the PLL control, such zero-cross is performed within the switching period of the power feeding phase. Switching of the power feeding phase is performed in the detection period of the back electromotive force.

On the other hand, if the PLL control is no longer performed normally, the zero-cross point does not appear in the detection period of the back electromotive force, namely in the switching period of the power feeding phase. Accordingly, in the acceleration mode due to the PLL control, a masking signal (MSK1 and MSK2) for detecting the zero-cross point only within the switching period of the power feeding phase is generated and the zero-cross point is detected in the period preset by this masking signal. Thereby, unlock condition of the PLL control is logically judged and thereby the result (ACCFAIL) is outputted to the system.

The present invention has been explained practically based on the preferred embodiments but the present invention is not limited to above embodiments and allows various changes or modifications without departure from the scope of the claims thereof.

For example, in the present invention, various parameters for detection of magnetic pole position and determination of fault can be set logically in variable but these parameters can be fixed previously at the time of setting. For example, these parameters may be stored, as explained above, to a non-volatile memory such as flash memory. In this case, it is recommended to introduce the structure that contents of the non-volatile memory are externally updated and manipulated freely via a serial input/output port. Moreover, it is also possible that a plurality of programs such as drive sequence are stocked in such non-volatile memory and a user can select the necessary program from these programs and then execute the selected program.

In above explanation, the present invention has been applied to the drive control of the spindle motor of HDD which is the main application field as the background thereof. However the present invention is not limited thereto and can also be applied, for example, to the drive control of spindle motor such as the optical memory drive or optical magnetic memory.

The effects of the present invention may be briefly explained as follows.

On the occasion of driving a multi-phase sensor-less motor, condition of the sensor-less motor at the time of drive can be detected accurately and even when drive error of sensor-less motor is generated, recovery from drive error and re-drive of the motor can be performed quickly. Moreover, when the sensor-less motor is driven successfully and shifts to the PLL control condition, unlock of the PLL is accurately detected and can be recovered quickly from the fault condition. In addition, in the case where the rotating position of rotor is detected with the zero-cross of B-EMF, detection of zero-cross can be performed accurately. As a result, the sensor-less motor can be driven surely and quickly. Moreover, it is also possible that error may be detected accurately and process after generation of fault can be executed quickly and adequately.

What is claimed is:

1. A drive control system for sensor-less motor for driving a motor and executing PLL control to rotary drive by switching a current of a field coil in each phase of the multi-phase motor depending on the rotating phase of the motor, comprising:

power feeding means for feeding electrical power, for the predetermined period, to a field coil in the phase other than the detection phase by defining a desired phase as the detection phase at the time of driving a motor:

induced voltage detecting means for detecting a voltage induced on said coil of the detection phase through said power feeding;

magnetic pole position detecting means for detecting the magnetic pole position of a rotor from the amplitude condition of said induced voltage;

driving means for determining the power feeding phase for drive of motor based on the detection result of said magnetic pole position detecting means, and executing the power feeding for drive depending on said determination; and controlling means for alternately conducting detection of magnetic pole position by said power feeding means, induced voltage detecting means, and magnetic pole position detecting means, and power feeding to drive a motor by said driving means;

wherein unlock of the PLL control is detected when the motor rotation is accelerated with the PLL control, and the control sequence for recovery to normal condition is executed by setting a flag when unlock is detected.

2. A drive control system for sensor-less motor according to claim 1, wherein a fault of said PLL control is judged depending on whether the zero-cross of B-EMF is detected or not in the B-EMF detection section under the control of motor rotation with the PLL control.

* * * * *